United States Patent [19]

Smith et al.

[11] Patent Number: 5,283,099
[45] Date of Patent: Feb. 1, 1994

[54] ENHANCED STRUCTURAL CORE MATERIAL

[75] Inventors: Charles R. Smith, La Mesa; Bruce H. Schrier, Fallbrook, both of Calif.

[73] Assignee: Dynamic Technologies, Inc., Scottsdale, Ark.

[21] Appl. No.: 764,801

[22] Filed: Sep. 24, 1991

[51] Int. Cl.$^5$ .............................................. B32B 3/12
[52] U.S. Cl. ...................................... 428/116; 428/178; 428/182; 428/183; 428/184; 428/185; 428/186; 428/117; 428/118; 428/105; 428/107; 428/109; 428/110; 428/161; 428/162; 428/192; 428/99; 428/457; 428/408; 428/426; 156/210
[58] Field of Search ............... 428/178, 182, 183, 184, 428/185, 186, 116, 117, 118, 105, 107, 109, 110, 161, 162, 192, 99, 457, 408, 426; 156/210

[56] References Cited

U.S. PATENT DOCUMENTS

| Re. 27,973 | 4/1974 | Pennington et al. | 156/175 |
|---|---|---|---|
| 1,802,880 | 4/1931 | Cumfer . | |
| 2,091,918 | 8/1937 | Finck | 428/182 |
| 2,553,054 | 5/1951 | Lincoln et al. | 154/1.8 |
| 2,719,807 | 10/1955 | Steele | 156/210 |
| 2,779,388 | 1/1957 | Quoss | 154/30 |
| 2,887,721 | 5/1959 | Blanchi | 18/14 |
| 3,218,217 | 11/1965 | Geschwender | 156/474 |
| 3,301,729 | 1/1967 | Kauffman | 156/252 |
| 3,607,536 | 9/1971 | Bragole | 156/272 |
| 3,629,028 | 12/1971 | McLartoy et al. | 156/175 |
| 3,667,268 | 6/1972 | Rech | 72/133 |
| 3,676,249 | 7/1972 | Limelson | 156/244 |
| 3,700,518 | 10/1972 | Ohmori | 156/152 |
| 3,733,228 | 5/1973 | Wesch | 156/172 |
| 3,775,234 | 11/1973 | Rich | 428/183 |
| 3,810,816 | 5/1974 | Zachariades | 161/214 |
| 3,874,329 | 4/1975 | McLarty | 118/125 |
| 3,922,426 | 11/1975 | Feltzin | 428/295 |
| 3,947,206 | 3/1976 | DeLigt et al. | 425/388 |
| 4,012,267 | 3/1977 | Klein | 156/178 |
| 4,012,553 | 3/1977 | Clemens | 428/285 |
| 4,019,062 | 4/1977 | Rongren | 250/492 |
| 4,055,769 | 10/1977 | Sander | 250/492 R |
| 4,092,443 | 5/1978 | Green | 427/53 |
| 4,130,451 | 12/1978 | Hamilton et al. | 156/86 |
| 4,132,581 | 1/1979 | Swartz | 156/208 |
| 4,144,369 | 3/1979 | Wass | 428/182 |
| 4,182,665 | 1/1980 | Mibu et al. | 204/159.15 |
| 4,186,044 | 1/1980 | Bradley et al. | 156/273 |
| 4,222,835 | 9/1980 | Dixon | 204/159.16 |
| 4,228,209 | 10/1980 | Chavannes | 156/210 |
| 4,230,766 | 10/1980 | Gaussens et al. | 428/288 |
| 4,252,592 | 2/1981 | Green | 156/272 |
| 4,252,593 | 2/1981 | Green | 156/231 |

(List continued on next page.)

FOREIGN PATENT DOCUMENTS 3431867 9/1986 Fed. Rep. of Germany .

OTHER PUBLICATIONS

Handbook of Pulp & Paper Technology, 2nd Ed. Van Nostrand Runhold Co., "Corrugated Containers", by George G. Maltinfort, pp. 557-563.
Tappi Journal "Gluing Corrugating Medium & linesboard together on the Corrugator", by Daub, Hake, Gottsching, Jun. 1990, pp. 171-178.
Tappi Journal, "Glueability at the Corrugator", by Lepoutre, Unoue, Nov. 1989, pp. 113-120.
"Radiation Curing of Polymeric Materials", C. E. Hoyle 1990 American Chemical Society, pp. 1-16.
"Fiber-Reinforced Composites", P. K. Mallick, Marcel Dekker Inc., pp. 61-68, 345-375.

Primary Examiner—Ellis P. Robinson
Assistant Examiner—William P. Watkins, III
Attorney, Agent, or Firm—Charles E. Cates

[57] ABSTRACT

The invention relates to honeycomb core components having an undulating configuration reinforced with structural rods or columns which provide nesting sites for indexing with the flutes or nodes of adjacent components when assembled in stacked relation. Methods are also disclosed for producing the core components and assembling them in finished honeycomb core configuration.

6 Claims, 3 Drawing Sheets

U.S. PATENT DOCUMENTS

| | | | |
|---|---|---|---|
| 4,276,352 | 6/1981 | Green | 428/473.5 |
| 4,276,479 | 6/1981 | Mibu et al. | 250/492 R |
| 4,333,779 | 6/1982 | Rinker et al. | 156/73.1 |
| 4,409,274 | 10/1983 | Chaplin et al. | 428/182 |
| 4,477,707 | 10/1984 | Kim | 219/10.55 A |
| 4,479,984 | 10/1984 | Levy et al. | 427/54.1 |
| 4,500,583 | 2/1985 | Naul | 428/182 |
| 4,515,737 | 5/1985 | Karino et al. | 264/22 |
| 4,568,593 | 2/1986 | Green | 428/184 |
| 4,631,215 | 12/1986 | Welygan et al. | 428/183 |
| 4,699,802 | 10/1987 | Nakos et al. | 427/54.1 |
| 4,747,894 | 5/1988 | Johnston et al. | 156/73.1 |
| 4,753,704 | 6/1988 | Stewart | 156/175.5 |
| 4,758,397 | 7/1988 | Schreiner et al. | 264/166 |
| 4,770,834 | 9/1988 | Nakasone et al. | 264/127 |
| 4,814,119 | 3/1989 | Scholz | 264/22 |
| 4,861,621 | 8/1989 | Kanzaki | 427/54.1 |
| 4,867,824 | 9/1989 | Gill et al. | 156/175 |
| 4,876,153 | 10/1989 | Thorfinnson | 428/447 |
| 4,892,764 | 1/1990 | Drain et al. | 428/34.5 |
| 4,904,536 | 2/1990 | Livesay | 428/515 |
| 4,935,082 | 6/1990 | Bennett et al. | 156/205 |
| 4,948,445 | 8/1990 | Hees | 156/196 |
| 4,956,221 | 9/1990 | Gutek | 428/142 |
| 5,043,128 | 8/1991 | Umeda | 264/258 |
| 5,055,242 | 10/1991 | Vare | 264/22 |

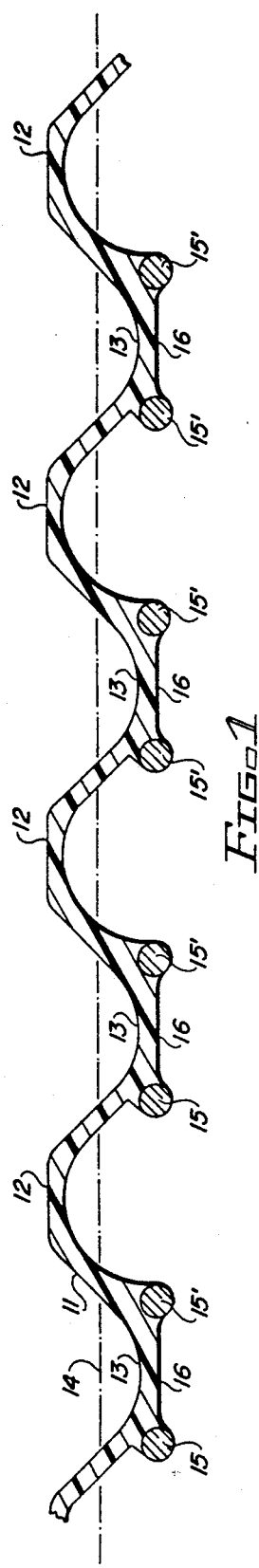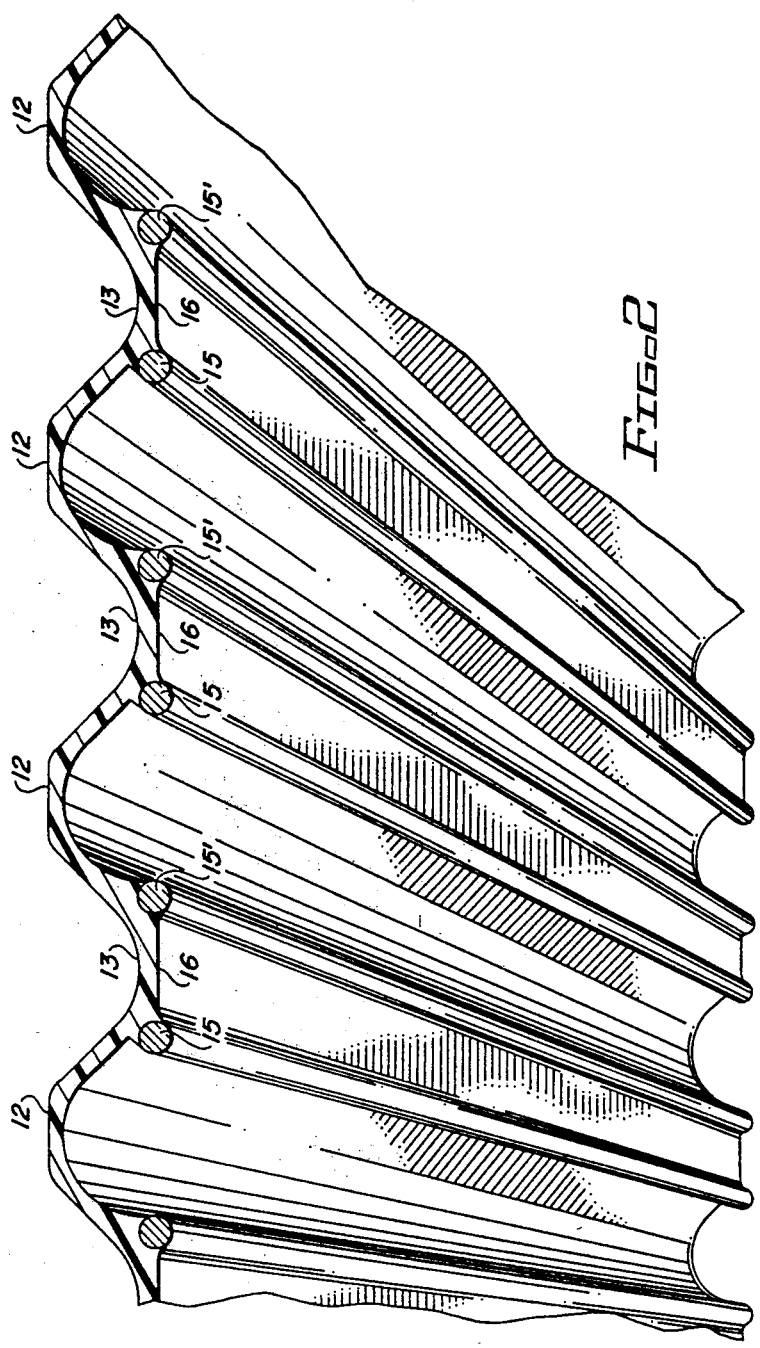

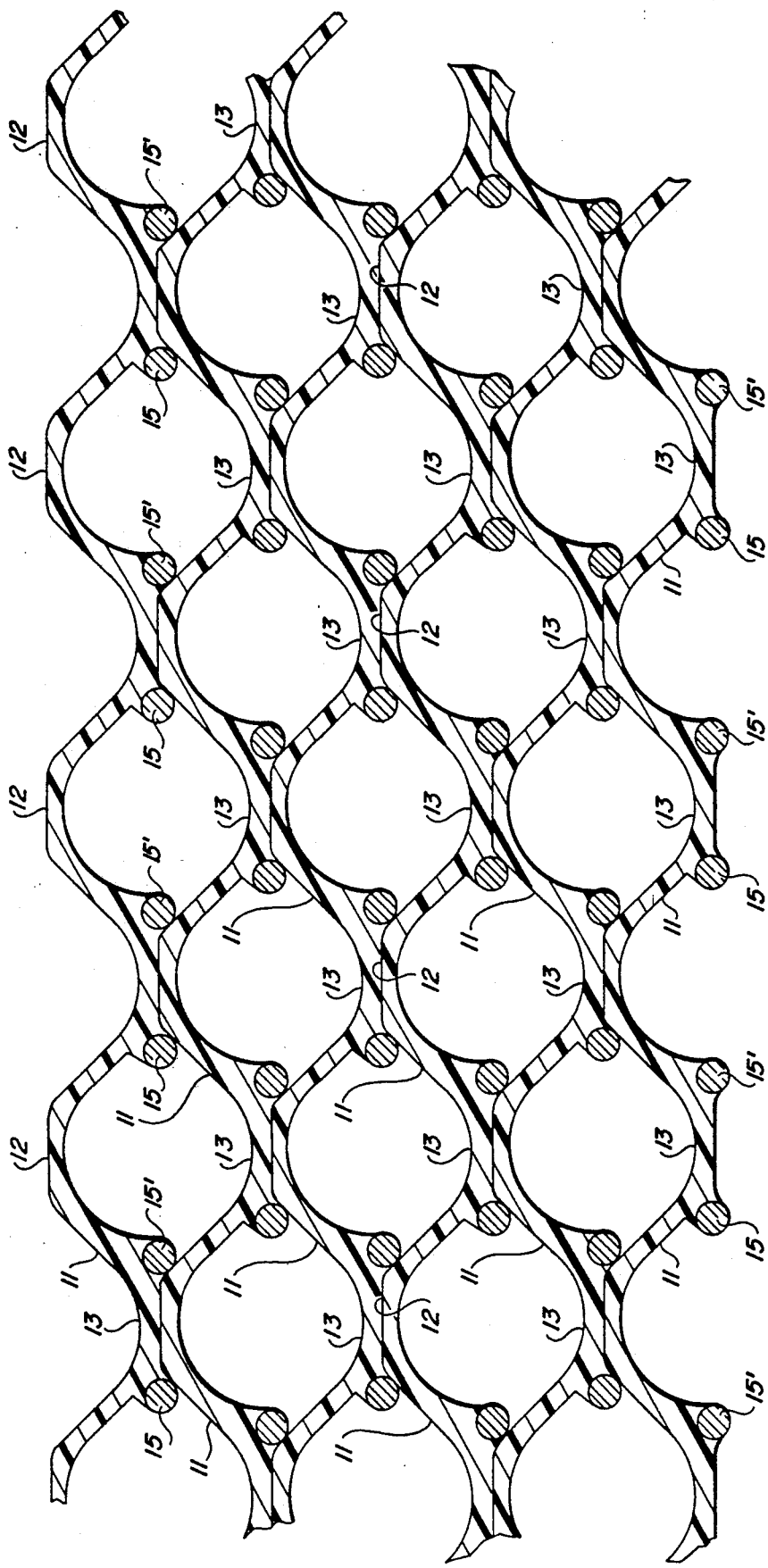

ENHANCED STRUCTURAL CORE MATERIAL

FIELD OF THE INVENTION

This invention relates to structural core materials based loosely on existing honeycomb core designs, but comprising uniquely configured core components that are assembled and bonded together in a novel manner to produce several new and useful advantages over existing prior art. More particularly, the invention incorporates a unique column design which assists in indexing of the core components during assembly and in reinforcement of the finished product.

BACKGROUND OF THE INVENTION

Civilization has been highly influenced by the emergence of very efficient structural materials (materials possessing a high strength/weight ratio). Mankind's ability to feed, clothe, shelter, transport, educate and provide adequate medical care for itself can be shown to be directly linked with structures possessing high structural efficiency.

Engineers, in their effort to design structures with superior strength/weight ratios, have relied increasingly on "sandwich" configurations consisting of low density core materials with high strength face sheets. The aircraft industry is an excellent example of where light weight, high strength structures are routinely designed. It is not uncommon for the aircraft industry to select "honeycomb" type materials as the core material. Commercially available honeycomb core materials in use today are made of bonded web materials. The web materials are either metallic foils or fiber/matrix composites.

Two existing methods for producing honeycomb structural materials are (a) the hobe method, which is the cardboard box technique of laying up layers of web material with offset stripes of glue, followed by using a jack to pull the layers apart; and (b) the corrugating method, which consists of producing corrugated sheets, registering (matching up) the nodes or the tips of the flutes, and then adhering them by spot gluing, welding or the like. The present invention is an improvement on the latter approach.

The prior art technique of corrugating sheets and then forming a core material from two or more of these sheets is illustrated in a number of U.S. Pat. for example No. 3,700,518; No. 4,935,082; and No. 4,948,445. The assembling technique involved in this method suffers from some recognized difficulties. For example, in order to join the nodes or flute tips of adjacent corrugated sheets, it is necessary for the operator to register the matching nodes by hand and eye and then use special pains to insure that, once registered correctly, the layers will not creep or slip before the adhesive sets. Also, the minimum bonding area involved in spot adhering provides a weak point in the overall strength of the core. Further, the sharp creases normally found in conventional corrugation core nodes contribute an additional weakness in the overall core strength.

It is an object of the invention to provide a honeycomb core material which substantially overcomes the several problems referred to above.

It is another object of the invention to provide honeycomb core components which have inherent indexing or nesting features permitting automatic registration of the matching nodes of adjacent components.

It is a further object to provide core components which provide greater bonding areas between adjacent components and avoid the creases of conventional corrugation techniques, whereby the strength of the core is substantially increased.

It is a further object of the invention to provide for reinforcing integral columns that will greatly add to the compression carrying capacity of the material.

It is a still further object to provide a method for producing core components, wherein the basic raw materials are processed in a continuous integrated procedure adaptable for a fully automated production system.

Other objects and advantages of the invention will become apparent as the specification proceeds.

SUMMARY OF THE INVENTION

The present invention is based on a honeycomb core component comprising a web of core material having an undulating longitudinal cross section generally in the shape of a sine curve, with generally semicircular upper sections or nodes alternating with generally semicircular lower sections or nodes above and below the horizontal axis of the web, and with laterally extending rods attached in spaced apart pairs along the bottom surface of the lower nodes. The laterally extending rods on the lower nodes provide nesting sites for the upper nodes of adjacent stacked components.

The invention also comprises an assembled core structure comprising multiple core components stacked in nested relationship, wherein the individual core components are as described above, and the upper nodes of said components are adhered in nested relation to the lower nodes of the next adjacent core component stacked above it.

The invention further includes a method for producing a honeycomb core component comprising the steps of feeding a web of core material between opposing corrugation dies to produce a web having an undulating corrugated longitudinal cross section with upper flutes or nodes alternating with lower flutes or nodes above and below the horizontal axis of the web; depositing spaced apart pairs of rods laterally on the outer surface of the nodes on one side of the web; and treating the web to adhere the rods to said nodes.

A preferred embodiment of the method of the invention comprises preparing an array of oriented fibers; impregnating the array with a radiant curable resin; feeding the resin-impregnated array between opposing corrugation dies to produce a web having an undulating longitudinal cross section with upper flutes or nodes alternating with lower flutes or nodes above and below the horizontal axis of the web; depositing spaced apart pairs of rods laterally on the outer surface of the nodes on one side of said web; and directing rays from a source of radiant energy against said web to cure the web, thereby setting the corrugated configuration and adhering said rods to said nodes.

BRIEF DESCRIPTION OF THE DRAWINGS

The objects, features and advantages of the invention will be apparent to those skilled in the art from the following detailed description, taken together with the accompanying drawings, in which:

FIG. 1 is a cross-sectional side view of a honeycomb core component of the present invention.

FIG. 2 is a perspective cross-sectional view showing the core component of the invention.

FIG. 3 is a cross-sectional side view of multiple core components assembled in nested configuration to provide a block of the honeycomb core of the invention.

DETAILED DESCRIPTION OF THE INVENTION

Figure 4:
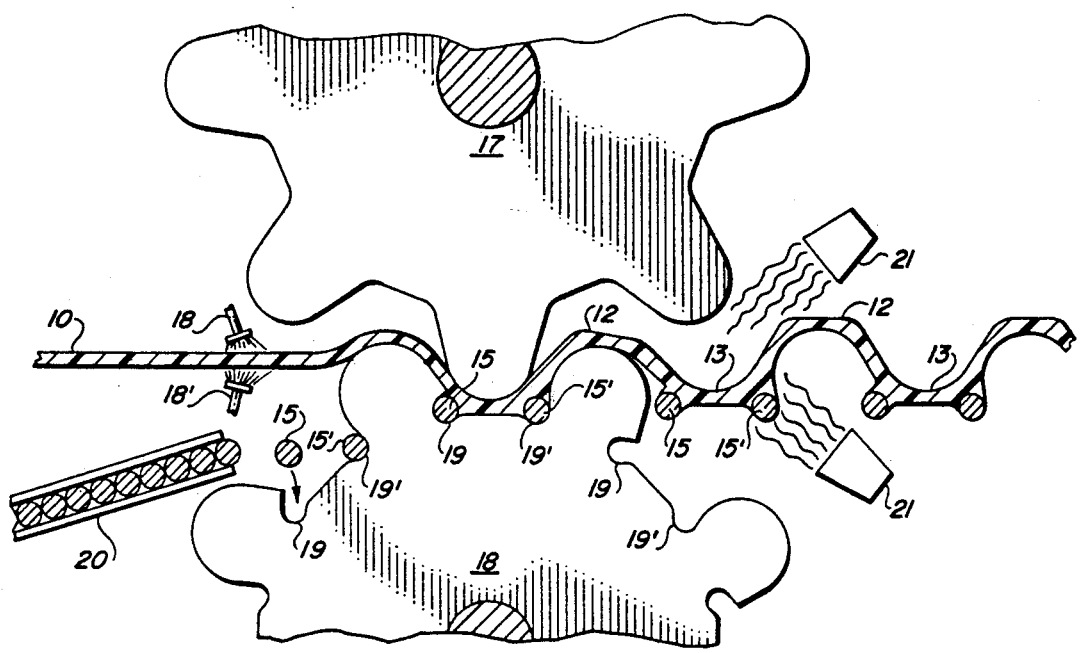
FIG. 4 is a schematic representation showing the mechanism and method for producing the core components of the invention.

Referring to the drawings, the honeycomb core component of the present invention, as shown in FIGS. 1 and 2, comprises a Web 11 of core material having a longitudinal cross section generally in the shape of a sine curve, with generally semicircular upper flutes or nodes 12 alternating with generally semicircular lower flutes or nodes 13 above and below the horizontal axis 14 of the web. Laterally extending rods 15 and 15' are attached in spaced apart pairs along the bottom surface of the lower nodes 13.

It is a feature of the invention that the pairs of rods 15 and 15' are attached on opposing sides of the bottom-most point of said lower nodes 13, whereby the area 16 between rods 15 and 15' provides a nesting site for registering with the apexes of the upper nodes 12 of an adjacent core component when multiple core components are stacked in the configuration shown in FIG. 3.

The web 11 may be any moldable or otherwise formable material that is suitable for inclusion in a honeycomb core. Preferred materials include fiber/resin composites and lightweight metal foils.

The rods 15 and 15' likewise are made from any suitable material. Preferred materials include graphite or fiberglass. It is also within the contemplation of the invention that the rods be made from the same or similar materials as the web 11 and that they be formed as an integral part of the web when it is formed into its undulating shape. For certain uses, it is advantageous to include two or more rod materials in the same web or block of core. It is preferred that the rods be cylindrical or near triangular in cross section, although other shapes such as square, rectangular, etc. are operable in the invention. Any suitable glue, resin or other adhesive may be used for adhering the rods to the web 11. A preferred embodiment for effecting the adhesion will be shown in subsequent sections of the specification relating to the method of forming the core component 11. Although the drawings illustrate application of pairs of rods 15 and 15' to each of the lower nodes 13, it is noted that reducing the numbers of pairs by applying them only to alternating nodes 13, or to otherwise selected nodes 13, is also within the contemplation of the invention.

A preferred embodiment of the method of producing the honeycomb core component of the invention is shown in FIG. 4. In this method, an array 10 of oriented fibers in dry form is fed through opposing corrugation dies 17 and 18. As the array 10 approaches the corrugation dies, a radiant curable resin is applied to the surface of the array through spray pipes 18 and 18'. Also, rods 15 and 15' are deposited in channels 19 and 19' in corrugation die 18, said rods being supplied from an upstream rod-metering device 20.

As the resin-impregnated fiber web passes between corrugation dies 17 and 18, it is formed into the distinctive undulating cross section of the invention, with pairs of rods temporarily adhered on the bottom surface of each of the lower flutes or nodes 13 by the tackiness of the resin. Rays from a source of radiant energy 21 are directed against the downstream side of the corrugation dies 17 and 18 and serve to cure the undulating web 11 as it emerges from between the dies. The cure is very rapid, and the fiber/resin matrix which emerges from the dies is fully cured and completely rigid. The cure also serves to adhere the rods 15 and 15' to the bottom surfaces of the lower nodes 13 in a permanent manner, and to surround the rods with resin to form them as an integral part of the web.

As the web 11 continuously emerges from the corrugation dies, as shown, a standard severing machine (not shown) is used to sever measured lengths of the core components thus produced, making them available for stacking into finished cores.

In the embodiment shown in FIG. 4, the dry fiber array which is fed into the corrugation dies may be composed of any of the conventional strands of fibrous material, such as glass fiber or graphite fiber, which are used for the production of fiber/resin composites.

The resin which is applied to the fiber array may be any suitable radiant curable resin. Operable compositions include modified acrylic resins, vinyl polymers, unsaturated polyesters solubilized in vinyl monomers, and epoxy resins. Acrylic or methacrylic acid esters are preferred, with the most preferred compounds being the acrylic or methacrylic acid esters of polyhydric alcohols such as ethoxylated trimethylolopropane triacrylate and dipentaerythritol monohydroxy pentaacrylate. These resins have the advantage of curing extremely rapidly upon exposure to radiant energy, to permit completion of the cure upon emerging from the corrugation dies in the present invention. The resins are also usable without solvents and therefore have the advantage of releasing no solvents to the atmosphere during the cure stage. Radiant curable resins sold under the trademark LITE-TAK by Loctite Corporation, of Newington, Conn., are suitable for use in the invention. Known photoinitiators may be added to the resin compositions in amounts effective to respond to the radiant energy and to initiate and induce curing of the resin.

The source of radiant energy used to effect the cure may be any source of actinic rays capable of fastcuring the applied resin. Although a wide variety of radiant energy sources are available, including X-ray, E-beam, radioactive, and the like, the objects of the invention are most readily obtained with high intensity ultraviolet rays such as obtained from high intensity mercury lamps. Other sources of ultraviolet include tungsten and xenon lamps, carbon arcs, and the like.

An advantage of the use of a radiant curable resin and a source of radiant energy is that the cure obtainable is substantially instantaneous, and therefore complete setting of the undulating pattern is achieved even though the time of pressure between the opposing corrugation rolls 17 and 18 is very brief. If other materials are used requiring longer curing and longer exposure to pressure between dies, it is within the contemplation of the invention that other means, such as opposing lengths of endless chains carrying corrugation dies under pressure, may be used in place of the single corrugation dies shown in FIG. 4.

Figure 5:
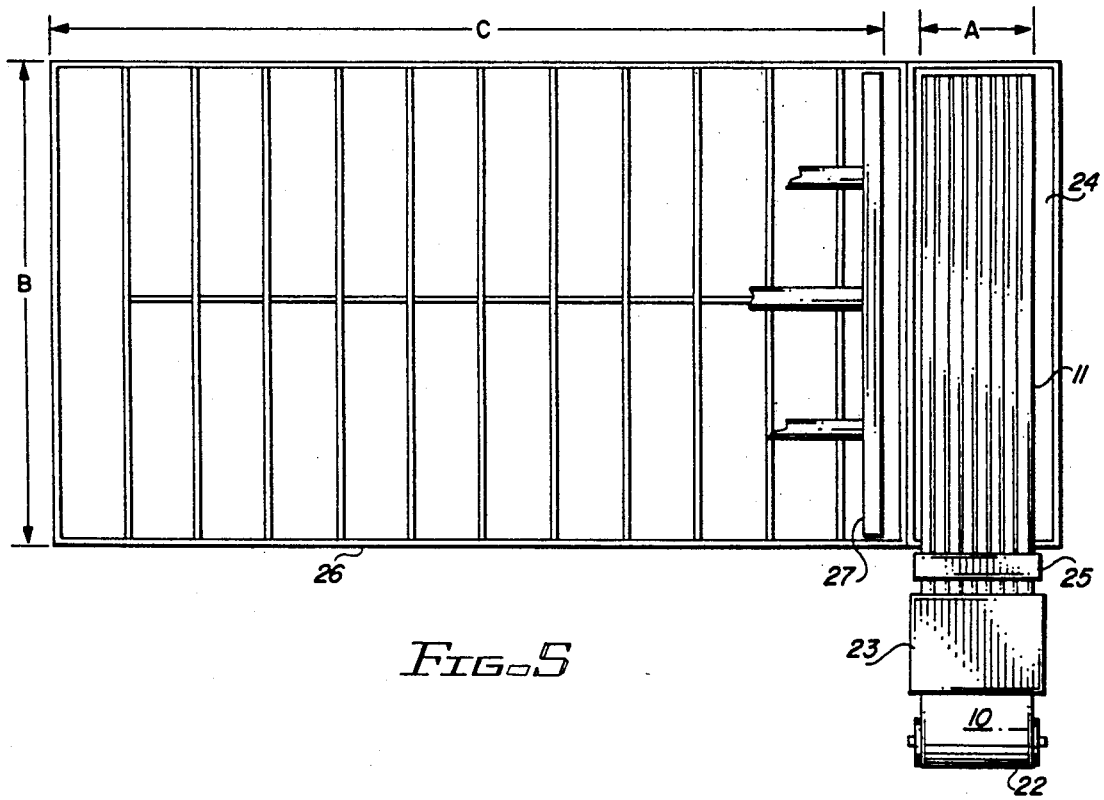
FIG. 5 is a schematic representation of an apparatus and method for stacking and assembling the core components of the invention into honeycomb core bodies or panels.

FIG. 5 is a schematic representation of apparatus and method for assembling the individual core components of the present invention into a finished honeycomb core. In the operation of the apparatus, the web 10 of dry fiber is fed from a continuous roll 22 into a corrugation machine 23, where the steps of spraying or injecting resin, applying the rods, forming the corrugations, and applying the radiation to cure the resin, are carried out. The continuous web 11 of corrugated core components emerging from the machine is run out onto a staging table 24 and cut into appropriate lengths by a severing machine 25. Following this, while the core component 11 is lying flat on the staging table 24, adhesive is applied to the upper nodes 12 of the core component. If desired, the adhesive may be of the same type of radiant curable resin used to produce the core component 11.

As the next step, using standard indexing fingers, the core component 11 is rotated 90° and, standing on its edge, is urged to the left onto stack table 26, into contact with compression plate 27. Preferably, compression plate 27 has been furnished with a facing sheet which adheres to the nodes 12 of the core component by means of the adhesive which has been applied. Compression plate 27 is made to operate as a reciprocating member, receding under compression from its initial, or proximal, position, as shown in FIG. 5, to a finished, or distal, position when the desired number of core components have been received on the stack table 26.

While the first core component 11 is being rotated and moved off the staging table 11 and urged against the compression plate 27, a second core component is being run onto the staging table 11 and severed. This second core component is likewise treated with adhesive on the nodes 12, and then rotated 90° and urged onto the stack table 26. In this operation, the nodes 12 of the second core component automatically register with the nesting areas 16 of the first core component, and the compression plate is incrementally moved toward its distal position. If desired, rays from a source of radiant energy (not shown) may be directed against the first and second core components to set the adhesive and cause a permanent bond between the nodes of the two elements. In like manner third, fourth and subsequent severed core components may be treated with adhesive, rotated, and added to the honeycomb core being assembled on the stack table 26, until the desired length of the core body or panel has been reached. During the assembly, top and bottom facing sheets are applied in known manner. As will be seen from FIG. 5, dimension A controls the thickness of the finished honeycomb core body, dimension B controls the width, and dimension C controls the length.

The honeycomb core product and method of the present invention include the following features which are significantly advantageous in terms of effectiveness and economy:

1. The serpentine or undulating configuration of the core components of the present invention eliminates the sharp creases normally found in conventional honeycomb core node locations. This is critical since a great deal of the structural core materials currently used throughout the world are based on a design in which the web consists of fiber reinforced composites. Sharp radiuses of curvature lead directly to residual internal fiber bending loads. These residual bending loads must be carried at the expense of live load carrying capacity. The serpentine web geometry of the present invention effectively eliminates these residual loads by greatly increasing the radius of curvature.

2. It is generally accepted that a circularly shaped cylinder is more efficient in axial compression applications than any other geometry (all other variables being held equal). The serpentine web geometry of the present invention, in conjunction with the reinforcing rods or columns, permits an approximately circular cell geometry.

3. The serpentine or undulating web feature of the present invention decreases the areal amount of web material required to fabricate a block of core of a given size when compared to conventional honeycomb core designs. An approximately 7% reduction in the web material requirement is achievable. This reduction is possible because the wasting of material in the corners of conventional honeycomb cores is avoided.

4. The honeycomb core of the present invention, because of the contribution of the reinforcing rods or columns, has a greater node bond area 16 than typical honeycomb materials. This increased node bond area permits a higher strength core to be fabricated.

5. The reinforcing rods or columns located at the web node sites in the present invention permit the core to support extremely high compression loads in the Z plane. Ordinarily, columns having extremely high aspect ratios when axially compressed undergo buckling at a load much less than the material's ultimate compression strength. In the present invention, the rods or columns are positioned at the node locations where they are supported against buckling approximately every 120°.

6. Most commercially available honeycombs are made using the "expansion" method in which it is critical for each of the webs to have a very nearly identical stiffness. The product of the present invention is made on a modified gear corrugation machine (see FIG. 4). Webs made in this fashion can easily be made from different materials and different thicknesses. This permits the product of the present invention to have "tailorable" properties that can be adapted to match the requirements with much greater ease.

7. A major advantage of the product of the invention is that it can be manufactured in a continuous, non batch, fashion. The core materials are not limited in size, except in the Z direction (see FIG. 5). Processing the webs through the modified gear corrugation machine utilizes a continuous roll of web material, which permits the core block to be fabricated in indefinite lengths. Once corrugated the individual core components are rotated to the vertical orientation, bonded to the core block. Thus, the core block is formed web by web. Since this web formation/web bonding operation is limited only by the size of the fixture, it becomes possible to fabricate core blocks of great width and length.

8. Since the core blocks or panels are made web by web, it is relatively easy to introduce wires, filament optics, pipes, waveguides, pigments, sensors, printing, strain gages, etc., into the core block structure during fabrication.

9. The structural rods or columns permit the core components to be self indexing or self nesting. This feature permits the core to be manufactured with exceptionally consistent core cell geometry. The consistency of the core cell geometry plays a significant role in the absolute strength of the core. In addition, the self indexing enhances the adaptability of the manufacturing procedure to automation.

Although various preferred embodiments of the invention have been described herein in detail, it will be understood by those skilled in the art that variations may be made thereto without departing from the spirit of the invention.

What is claimed is:

1. A honeycomb core comprising multiple core components stacked in nested relationship, wherein:
   a. each of said core components comprises an undulating web of core material having top and bottom surfaces and having a longitudinal cross section generally in the shape of a sine wave curve, with generally semicircular upper nodes alternating with generally semicircular lower nodes above and below the plane of the horizontal axis of said web, and with pairs of spaced apart rods attached along the bottom surface of said semicircular lower nodes in a direction parallel to said nodes; and
   b. each of said core components is adhered to the next adjacent core component stacked above it, with the apexes of its upper nodes nested between pairs of rods attached to matching lower nodes of said adjacent core component.

2. The honeycomb core component of claim 1 wherein the rods in each of said pairs attached to the bottom surface of said semicircular lower nodes are attached on opposing sides of the bottommost point of said lower nodes.

3. The honeycomb core component of claim 1 wherein said web material is a fiber/resin composite.

4. The honeycomb core component of claim 1 wherein said web material is a metallic foil.

5. The honeycomb core component of claim 1 wherein said rods are graphite.

6. The honeycomb core component of claim 1 wherein said rods are fiberglass.

* * * * *

UNITED STATES PATENT AND TRADEMARK OFFICE
CERTIFICATE OF CORRECTION

PATENT NO. : 5,283,099
DATED : February 1, 1994
INVENTOR(S) : Charles R. Smith et al It is certified that error appears in the above-identified patent and that said Letters Patent is hereby corrected as shown below:

On the title page:
Item: [73] Assignee: Dynamic Technologies, Inc.
Scottsdale, AZ.

Signed and Sealed this

Third Day of January, 1995

Attest:

BRUCE LEHMAN

*Attesting Officer*     *Commissioner of Patents and Trademarks*